United States Patent [19]
Martin

[11] Patent Number: 6,129,551
[45] Date of Patent: Oct. 10, 2000

[54] MATHEMATICAL GRAPH BOARD

[76] Inventor: Lowry G. Martin, 2617 Roosevelt Ave. #79, San Antonio, Tex. 78214

[21] Appl. No.: 09/048,680

[22] Filed: Mar. 26, 1998

[51] Int. Cl.[7] .............................. G09B 1/02; G09B 19/02
[52] U.S. Cl. .......................... 434/200; 434/188; 434/203; 434/205
[58] Field of Search ................................... 434/200, 188, 434/191, 203, 205, 212, 211

[56] References Cited

U.S. PATENT DOCUMENTS 5,639,090   6/1997   Stevens .................................... 434/211

*Primary Examiner*—Jessica J. Harrison
*Assistant Examiner*—Chanda Harris

[57] ABSTRACT

A new mathematical graph board for teaching linear equations and linear inequalities. The inventive device includes a board having an outer peripheral edge. The board includes a pair of peg boards secured within the outer peripheral edge. The pair of peg boards have a plurality of apertures therethrough. One of the peg boards has a four quadrant system disposed thereon. A plurality of graphing lines couple with the peg boards of the board. Each of the graphing lines is defined by a pair of pegs dimensioned for being received within the apertures of the peg boards. The pair of pegs have an elastic band extending therebetween. The elastic band varies a length of the graphing lines.

6 Claims, 2 Drawing Sheets

MATHEMATICAL GRAPH BOARD

BACKGROUND OF THE INVENTION

1. Field of the Invention

The present invention relates to teaching devices and more particularly pertains to a new mathematical graph board for teaching linear equations and linear inequalities.

2. Description of the Prior Art

The use of teaching devices is known in the prior art. More specifically, teaching devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art teaching devices include U.S. Pat. No. 5,433,611 to Dreyfous; U.S. Pat. No. 5,281,145 to Sidrak; U.S. Pat. No. 4,316,612 to Harder; U.S. Pat. No. 5,144,347 to Camp; Des. U.S. Pat. No. 344,097 to Green; and U.S. Pat. No. 3,970,312 to Senn.

While these devices fulfill their respective, particular objectives and requirements, the aforementioned patents do not disclose a new mathematical graph board. The inventive device includes a board having an outer peripheral edge. The board includes a pair of peg boards secured within the outer peripheral edge. The pair of peg boards have a plurality of apertures therethrough. One of the peg boards has a four quadrant system disposed thereon. A plurality of graphing lines couple with the peg boards of the board. Each of the graphing lines is defined by a pair of pegs dimensioned for being received within the apertures of the peg boards. The pair of pegs have an elastic band extending therebetween. The elastic band varies a length of the graphing lines.

In these respects, the mathematical graph board according to the present invention substantially departs from the conventional concepts and designs of the prior art, and in so doing provides an apparatus primarily developed for the purpose of teaching linear equations and linear inequalities.

SUMMARY OF THE INVENTION

In view of the foregoing disadvantages inherent in the known types of teaching devices now present in the prior art, the present invention provides a new mathematical graph board construction wherein the same can be utilized for teaching linear equations and linear inequalities.

The general purpose of the present invention, which will be described subsequently in greater detail, is to provide a new mathematical graph board apparatus and method which has many of the advantages of the teaching devices mentioned heretofore and many novel features that result in a new mathematical graph board which is not anticipated, rendered obvious, suggested, or even implied by any of the prior art teaching devices, either alone or in any combination thereof.

To attain this, the present invention generally comprises a board having a generally square configuration. The board has an outer peripheral edge. The board includes a pair of peg boards secured within the outer peripheral edge. A layer of foam material is disposed between the pair of peg boards. The pair of peg boards have a plurality of apertures therethrough. One of the peg boards has a four quadrant system disposed thereon. The four quadrant system has graphical markings disposed thereon. A second peg board has a single quadrant system disposed thereon. The single quadrant system has graphical markings disposed thereon. A plurality of graphing lines couple with the peg boards of the board. Each of the graphing lines is defined by a pair of pegs dimensioned for being received within the apertures of the peg boards. The pair of pegs have an elastic band extending therebetween. The elastic band varies a length of the graphing lines.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new mathematical graph board apparatus and method which has many of the advantages of the teaching devices mentioned heretofore and many novel features that result in a new mathematical graph board which is not anticipated, rendered obvious, suggested, or even implied by any of the prior art teaching devices, either alone or in any combination thereof.

It is another object of the present invention to provide a new mathematical graph board which may be easily and efficiently manufactured and marketed.

It is a further object of the present invention to provide a new mathematical graph board which is of a durable and reliable construction.

An even further object of the present invention is to provide a new mathematical graph board which is susceptible of a low cost of manufacture with regard to both materials and labor, and which accordingly is then susceptible of low prices of sale to the consuming public, thereby making such mathematical graph board economically available to the buying public.

Still yet another object of the present invention is to provide a new mathematical graph board which provides in the apparatuses and methods of the prior art some of the advantages thereof, while simultaneously overcoming some of the disadvantages normally associated therewith.

Still another object of the present invention is to provide a new mathematical graph board for teaching linear equations and linear inequalities.

Yet another object of the present invention is to provide a new mathematical graph board which includes a board having an outer peripheral edge. The board includes a pair of peg boards secured within the outer peripheral edge. The pair of peg boards have a plurality of apertures therethrough. One of the peg boards has a four quadrant system disposed thereon. A plurality of graphing lines couple with the peg boards of the board. Each of the graphing lines is defined by a pair of pegs dimensioned for being received within the apertures of the peg boards. The pair of pegs have an elastic band extending therebetween. The elastic band varies a length of the graphing lines.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
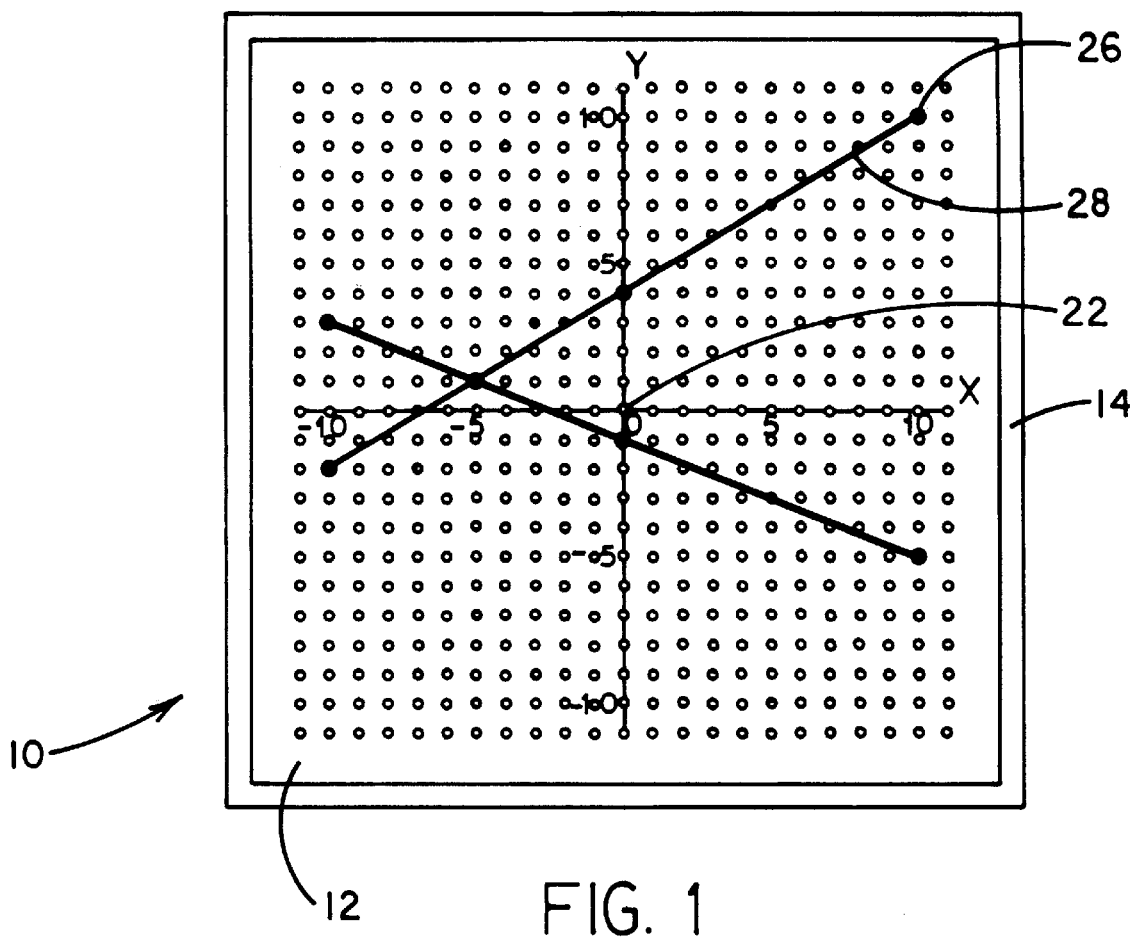
FIG. 1 is a front view of a new mathematical graph board according to the present invention illustrating a four quadrant surface.
Figure 2:
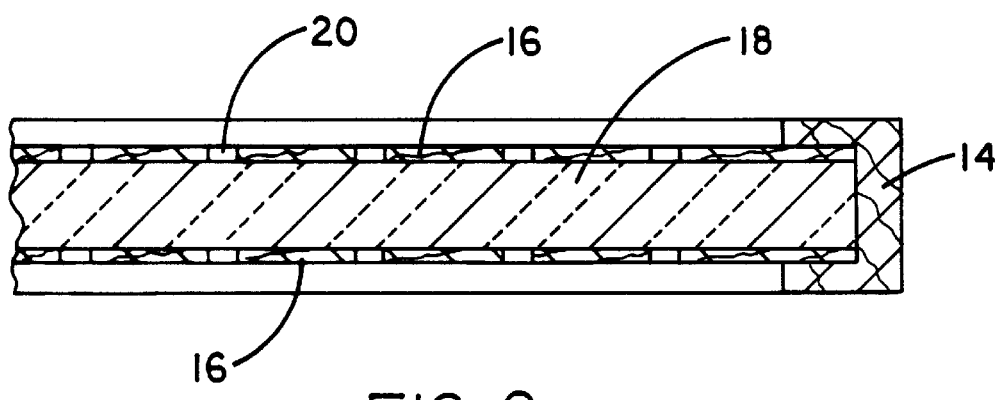
FIG. 2 is a cross-sectional view of the present invention.
Figure 3:
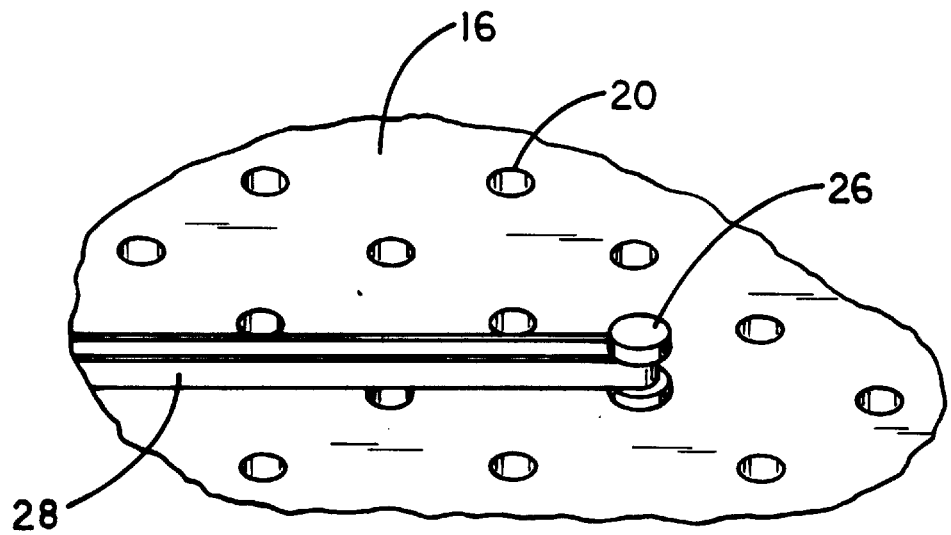
FIG. 3 is a perspective sectional view of the present invention illustrating the peg holes thereof.
Figure 4:
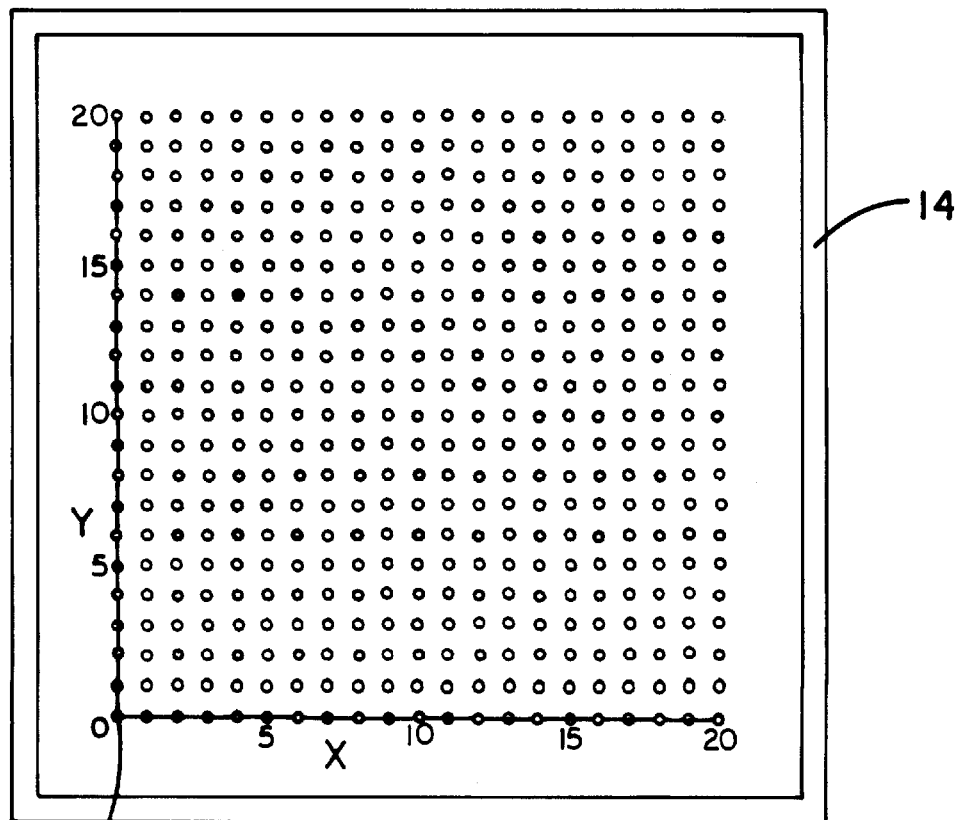
FIG. 4 is a front view of the present invention illustrating a single quadrant surface.

With reference now to the drawings, and in particular to FIGS. 1 through 4 thereof, a new mathematical graph board embodying the principles and concepts of the present invention and generally designated by the reference numeral 10 will be described.

As best illustrated in FIGS. 1 through 4, the mathematical graph board 10 comprises a board 12 having a generally square configuration. The board 12 has an outer peripheral edge 14. The board 12 includes a pair of peg boards 16 secured within the outer peripheral edge. A layer of foam material 18 is disposed between the pair of peg boards 16. The foam material 18 used is preferably Styrofoam ®. The pair of peg boards 16 have a plurality of apertures 20 therethrough. One of the peg boards 16 has a four quadrant system 22 disposed thereon. The four quadrant system 22 has graphical markings disposed thereon. The four quadrant system 22 is the standard Cortesian coordinate system. A second peg board 16 has a single quadrant system 24 disposed thereon. The single quadrant system 24 has graphical markings disposed thereon. The peg boards 16 would be finished with a coat of enamel paint which allows the user to dry-erase markers if desired.

A plurality of graphing lines couple with the peg boards 16 of the board 12. Each of the graphing lines is defined by a pair of pegs 26 dimensioned for being received within the apertures 20 of the peg boards 16. The pair of pegs 26 have an elastic band 28 extending therebetween. The elastic band 28 varies a length of the graphing lines. The pair of pegs 26 would allow points to be plotted. The elastic bands 28 would generate lines for measuring.

In use, the present invention would permit the learner to enjoy hands-on interaction with the subject matter while providing a more effective teaching style. The present invention could be used to work problems involving similar triangles, right triangles, Pythagorean theorem, trigometric ratios, and adding and subtracting integers and vectors. The present invention could also be used to solve problems involving percent, distance, rate and time, and any other proportion.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A mathematical graph board for teaching linear equations and linear inequalities comprising, in combination:

a board having a generally square configuration, the board having an outer peripheral edge, the board including a pair of peg boards secured within the outer peripheral edge, a layer of foam material disposed between the pair of peg boards, the pair of peg boards having a plurality of apertures therethrough, one of the peg boards having a four quadrant system disposed thereon, the four quadrant system having graphical markings disposed thereon, a second peg board having a single quadrant system disposed thereon, the single quadrant system having graphical markings disposed thereon; and a plurality of graphing lines coupling with the peg boards of the board, each of the graphing lines being defined by a pair of pegs dimensioned for being received within the apertures of the peg boards, the pair of pegs having an elastic band extending therebetween, the elastic band varying a length of the graphing lines.

2. A mathematical graph board for teaching linear equations and linear inequalities comprising, in combination:

a board having an outer peripheral edge, the board including a pair of peg boards secured within the outer peripheral edge, the pair of peg boards having a plurality of apertures therethrough, one of the peg boards having a four quadrant system disposed thereon; and a plurality of graphing lines coupling with the peg boards of the board, each of the graphing lines being defined by a pair of pegs dimensioned for being received within the apertures of the peg boards, the pair of pegs having an elastic band extending therebetween, the elastic band varying a length of the graphing lines.

3. The mathematical graph board as set forth in claim 2 and further including a layer of foam material disposed between the pair of peg boards.

4. The mathematical graph board as set forth in claim 2 wherein the four quadrant system has graphical markings disposed thereon.

5. The mathematical graph board as set forth in claim 2 wherein one of the peg boards has a single quadrant system disposed thereon.

6. The mathematical graph board as set forth in claim 5 wherein the single quadrant system has graphical markings disposed thereon.

\* \* \* \* \*